(No Model.)  2 Sheets—Sheet 1.

W. N. B. ALDERSON.
DEVICE FOR TESTING AND HANDLING EGGS.

No. 505,429. Patented Sept. 26, 1893.

Witnesses:  
Wm. C. Dashiell  
May E. Moore

Wm. N. B. Alderson  
Inventor  
Wm. Moore  
Atty.

(No Model.) 2 Sheets—Sheet 2.

W. N. B. ALDERSON.
DEVICE FOR TESTING AND HANDLING EGGS.

No. 505,429. Patented Sept. 26, 1893.

Witnesses:

Wm. N. B. Alderson,
Inventor

UNITED STATES PATENT OFFICE.

WILLIAM N. B. ALDERSON, OF EUREKA SPRINGS, ARKANSAS, ASSIGNOR OF ONE-HALF TO EDWIN R. RAY, OF SAME PLACE.

DEVICE FOR TESTING AND HANDLING EGGS.

SPECIFICATION forming part of Letters Patent No. 505,429, dated September 26, 1893.

Application filed April 3, 1893. Serial No. 468,864. (No model.)

*To all whom it may concern:*

Be it known that I, WILLIAM N. B. ALDERSON, a citizen of the United States, residing at Eureka Springs, in the county of Carroll and State of Arkansas, have invented certain new and useful Improvements in Devices for Testing and Handling Eggs; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to an improved device for testing and handling eggs, that is a device for lifting or transferring the eggs from the crate or to the crate as well as to expose the eggs so that a number may be examined by the light to ascertain whether good or bad, and the object of my invention is the provision of a device of the character and for the purpose stated which will be simple, durable and inexpensive, which will be comparatively light in weight and easy and convenient to manipulate and thoroughly practical in operation whereby a useful and economical device is provided.

To attain the desired objects the invention consists of a device for handling eggs embodying novel features of construction, combination and adaptation of parts substantially as disclosed herein.

In order that the operation and advantages of my device may be readily understood and appreciated I have illustrated in the accompanying drawings a device constructed according to my invention.

Figure 1:
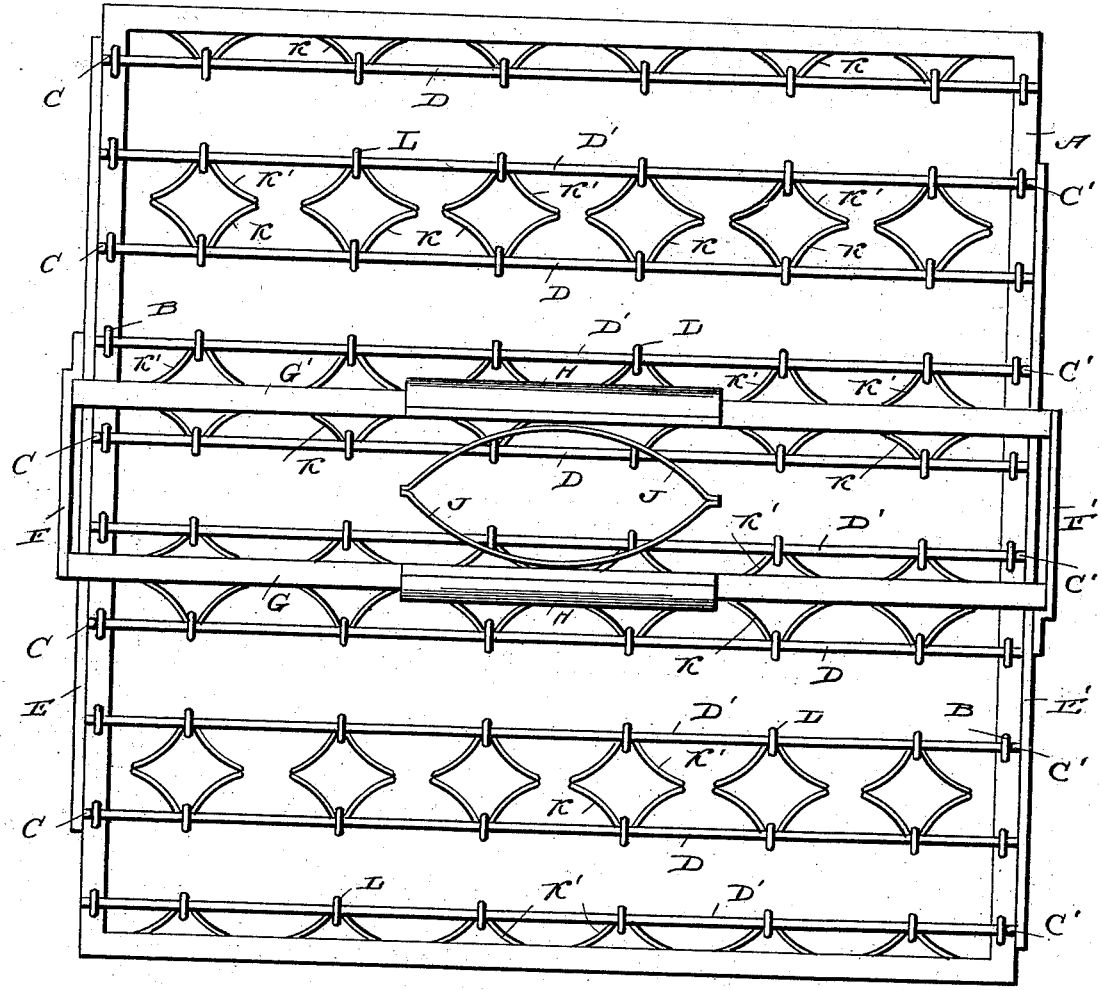
Figure 2:
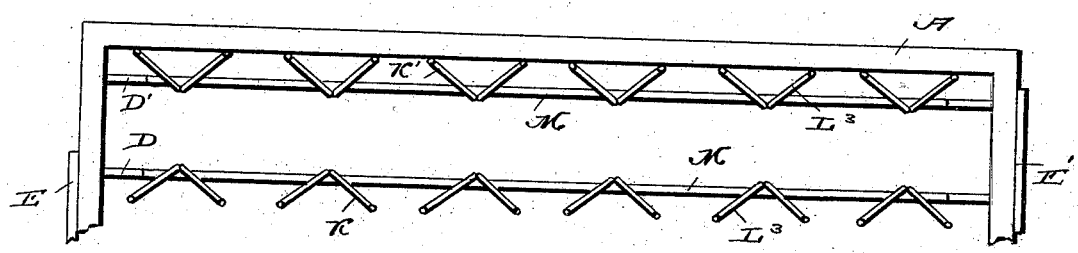
Figure 3:
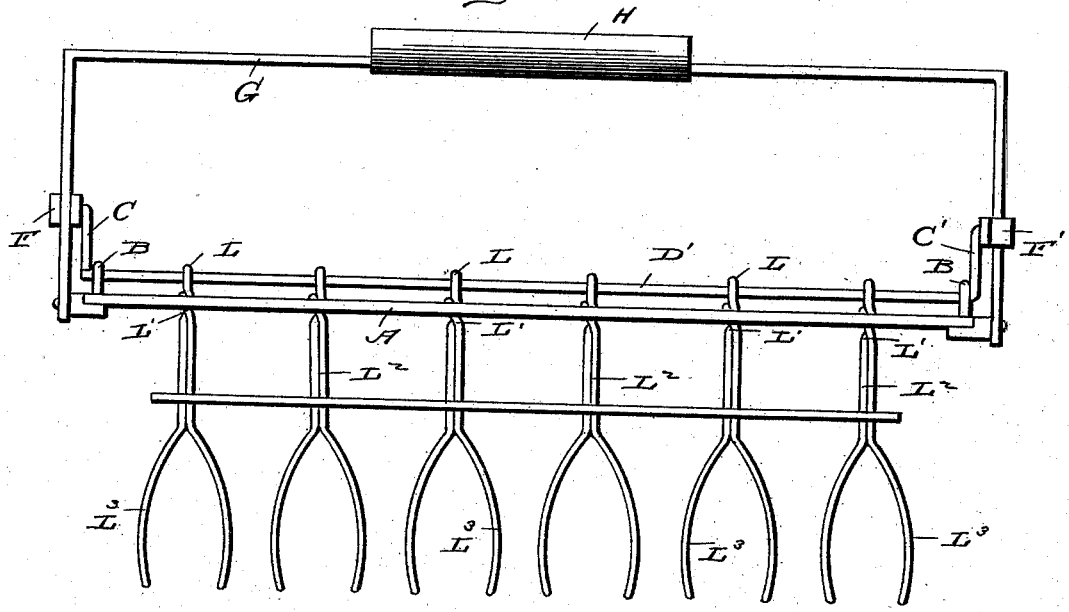
Figure 4:
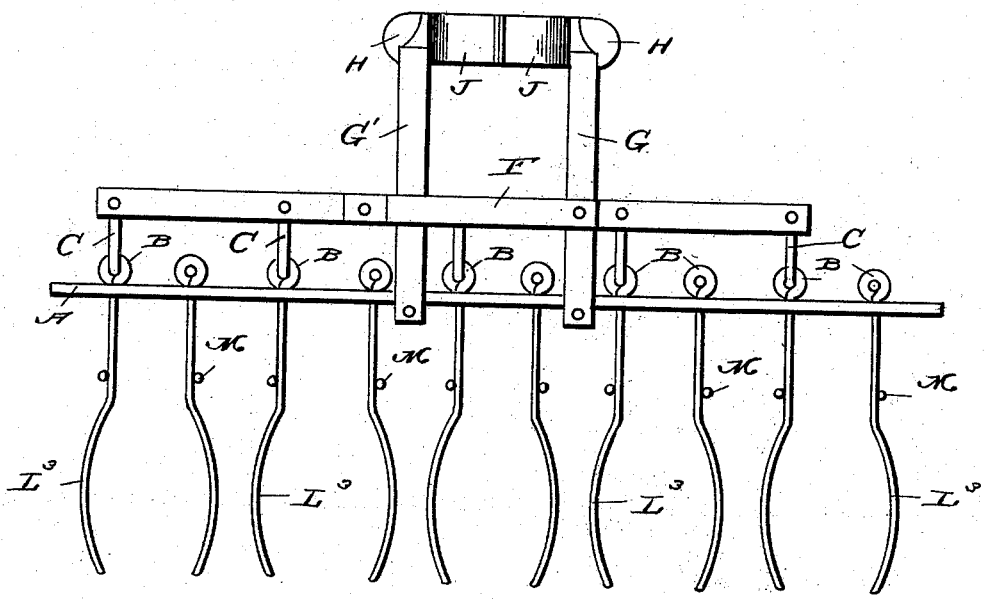

Figure 1 is a top plan view of my device; Fig. 2 a bottom plan view thereof; Figs. 3 and 4 elevations of the device.

Referring by letter to the drawings—A designates the frame of my device, which is of square or rectangular form and has on two of its sides on the upper side or face thereof the eyes or bearings B which are arranged along the entire face of the sides at equal distances apart and in said eyes or bearings are mounted the series of rods or shafts D and D' which each have cranks C and C'. The cranks on the ends of the rods or shafts are arranged and bear alternately in the eyes or bearings as well as the straight ends thereof and this places the cranks in a series of pairs, and the cranks C are connected to the rod E and the cranks C' are connected to the rod E', and the rod E carries a guide plate or strip F and is connected to the pivoted handle or bail G and the rod E' carries a strip or plate F' and is connected to the pivoted bail or handle G', the handles thus serving to move the rods toward each other, and the bails have the gripping portions H, and the springs J for returning the bails or handles to their normal position. To the rods are connected in series the grippers or lifters K and K' for engaging and lifting the eggs, and these grippers are made of a single or more pieces of wire bent first into a loop or eye L for passing around the rods, then bent or twisted together at L', then having the branches passing down close together to provide the arm L$^2$ and then bent or curved to provide the gripping arms L$^3$, which are of the proper shape to conform to the eggs for enabling the arms to engage and lift the eggs without danger of breaking them, and these grippers are securely braced or fixed together by the rods M.

The operation of my device will be readily understood from the foregoing description taken in connection with the accompanying drawings and I will simply state that the device is lowered into the crate so that the grippers will surround the eggs, and when in this position the handles are pressed inward and by reason of their connections the grippers are caused to press around and engage the eggs and the device can then be lifted and all the eggs in the cells of the crate will be lifted bodily and they can then all be exposed at once to the light to ascertain whether good or bad and may afterward be transferred bodily wherever desired.

The device can be made of any size or capacity according to the number of eggs to be lifted and it is preferably made of light material as wire.

It will be seen that I provide a simple, cheap and durable device which will save considerable time in the handling and testing of eggs, which will not break the eggs and which is easy and convenient to manipulate.

I claim as my invention—

1. A device of the character described, consisting of a frame, grippers depending from and pivotally connected to the frame, and means for operating the grippers to cause them to engage and release the eggs, for the purpose described.

2. A device of the character described, consisting of a frame, a series of rods or shafts mounted in the frame, grippers arranged in pairs and connected to the rods, and means for moving the rods to operate the grippers, for the purpose described.

3. A device of the character described, consisting of a frame, rods or shafts mounted in the frame and having a crank at one end, grippers carried by the rods, and handles connected to the cranks on the rods for operating the grippers for the purpose described.

4. A device of the character described, consisting of a frame, rods mounted therein and having a crank at one end, grippers connected to the rods and consisting each of two gripping arms bent to conform to the shape of an egg, and means for moving the rods to operate the grippers, for the purpose described.

5. A device of the character described, consisting of a frame, rods mounted in the frame, grippers carried by the rods, rods connected to the gripper rods, and pivoted handles connected to said rods and having springs for returning them to normal position, as described.

In testimony whereof I affix my signature in presence of two witnesses.

WILLIAM N. B. ALDERSON.

Witnesses:
C. W. BASSHAM,
H. M. C. WHITE.